United States Patent Office.

LEVI S. FALES, OF NEW YORK, N. Y., ASSIGNOR TO THE AMERICAN FERTILIZING COMPANY, OF SAME PLACE.

Letters Patent No. 111,734, dated February 14, 1871.

IMPROVEMENT IN TREATING BLOOD FOR THE MANUFACTURE OF FERTILIZERS

The Schedule referred to in these Letters Patent and making part of the same.

*To all whom it may concern:*

Be it known that I, LEVI S. FALES, of the city, county, and State of New York, have invented a new Process of Treating Blood for Fertilizing and other Purposes; and I do hereby declare that the following is a full, clear, and exact description of the same.

The object of this invention is to obtain blood in a pulverulent condition, in which it is not liable to putrefaction, and in which no animal life can exist, and without destroying its ammonia or nitrogen; and to this end The invention consists in treating the liquid blood with lime, soda, or potash, and acids, and afterward subjecting it to heat and agitation to evaporate its water.

The treatment is conducted in the following manner:

For every two thousand (2,000) pounds of liquid blood, I take fifteen (15) pounds of soda ash, fifteen (15) pounds of sal soda, and thirty (30) pounds of dry-slaked lime. I put the sal soda, soda ash, and lime into a kettle or open boiler, with twenty (20) gallons of fresh water, and, after boiling for two (2) hours, remove the solution to a tank of suitable capacity, and allow it to cool.

I then add to the solution twenty (20) pounds of muriatic acid and forty (40) pounds of sulphuric acid, and, during the effervescence which takes place, pour this mixture slowly into the blood, which has been previously heated in an open vessel, of a suitable size, to a temperature of about 180° Fahrenheit.

After the introduction of the mixture of lime, soda, and acid into the blood, I increase its temperature, gradually, to about 212° Fahrenheit, keeping it, in the meantime, stirred or agitated, and I keep it at about this temperature and continue the stirring or agitation until nearly all the water has been evaporated, and it has assumed the condition of a fine and slightly-moist powder, which I afterward dry by any known or suitable drying apparatus, such as is used for drying granular or pulverulent substances.

During the early stages of the evaporating process above described, the effervescence which is produced by the soda and acid breaks up the particles of the blood, and prevents them from agglomerating or caking, and so gradually brings the blood, as the evaporation proceeds, to the pulverulent condition.

The heating may be produced by heat applied outside of the evaporating-vessel, as by a fire under it, or a surrounding steam-jacket, and, in such case, the agitation or stirring may be produced by rotary or other mechanical stirrers within the vessel. Performed in this way, the evaporation occupies from ten to twenty-four hours. I, however, prefer to effect the evaporation by means of a mixture of superheated steam and air, introduced directly into the blood, and forced through it in numerous fine streams, which produce a thorough agitation at the same time as they impart the necessary heat, and also carry off the evaporated water from the blood. To do this I connect a pipe from a steam-boiler and a pipe of about the same caliber from a blowing or air-blast apparatus, with a pipe leading to a superheater, from which a pipe communicates with a perforated coil or distributer within the evaporating-vessel; and I regulate the relative proportions of steam and air by suitable cocks.

The temperature at which I commence the admission of this mixture of steam and air is about 300° Fahrenheit, which temperature indicated by a thermometer in the pipe leading from the superheater to the evaporating-vessel, may be maintained until the contents of the vessel arrive at a temperature of about 212° Fahrenheit, after which I gradually reduce the supply of steam and increase the supply of air as the evaporation proceeds, keeping the blood at about the temperature last mentioned until the evaporation is complete, which will generally be in about one hour. I have tried the evaporation with superheated steam alone, and with heated air alone, introduced as above described, but I obtain a much better result with the mixture of steam and air.

Instead of using sal soda and soda ash in the quantities above specified, potash may be substituted in quantity equal to the quantities of soda ash and sal soda.

The pulverulent blood obtained by this process contains all the nitrogen and ammonia originally contained in the blood, and also contains a certain proportion of sulphate of lime, and a sufficient quantity of free acid to prevent the existence of animal life in all but very hot weather. In performing the process in summer time, or on blood which is to be kept for summer use, I add to the quantity hereinabove stated, after it has been evaporated to such condition that it will not drip, about forty (40) pounds of sulphuric acid, which I sprinkle in gradually.

I have hereinabove stated the quantities of the several ingredients which I use in the process, and those temperatures at which I perform the process, which I consider to give the best results, but these may be, to some extent, varied without materially affecting the result.

It is not absolutely essential to the success of the process that two kinds of acid be used, but, by the use of the two kinds, a more intense effervescence is obtained, and, consequently, a better result.

I claim as my invention, and desire to secure by Letters Patent—

The process of treating blood with soda or potash, lime, acids, heat, and agitation, substantially as and for the purpose herein specified.

LEVI S. FALES.

Witnesses:
HENRY T. BROWN,
FRED. HAYNES.